Nov. 17, 1925.

E. TRIST

BRAKE BAND LINING SECURING MEANS

Filed Feb. 25, 1924

1,562,132

EDWARD TRIST INVENTOR

BY Victor J. Evans

ATTORNEY

Patented Nov. 17, 1925.

1,562,132

UNITED STATES PATENT OFFICE.

EDWARD TRIST, OF PITTSBURGH, PENNSYLVANIA.

BRAKE-BAND LINING-SECURING MEANS.

Application filed February 25, 1924. Serial No. 695,014.

*To all whom it may concern:*

Be it known that I, EDWARD TRIST, a subject of the King of Great Britain, residing at Pittsburgh, in the county of Allegheny and State of Pennsylvania, have invented new and useful Improvements in Brake-Band Lining-Securing Means, of which the following is a specification.

This invention relates to means for securing linings on brakebands and, more particularly, to securing brakeband linings on brakebands for automobiles and similar vehicles.

One of the main objects of the invention is to provide simple and efficient means whereby a lining may be quickly and efficiently secured on a brakeband at small cost. A further object is to provide securing means of this character which, in addition to securing the lining, will also serve to stretch it tightly about the brakeband or shoe. Further objects will appear from the detail description.

In the drawings:—

My invention is intended to be used in connection with a brakeband of any suitable or standard construction and is illustrated as used in connection with a brakeband which consists of two sections or shoes 1 of known construction which are supported in a known manner within a brake drum $a$ secured on wheel A of the automobile, these shoes being forced toward each other by tension springs $b$ the ends of which engage over hooked fingers $c$ projecting from the inner faces of the shoes. Shoes 1 are pivotally mounted at one end, in a known manner, and at the other end a cam $d$ is provided which is operated in a known manner to force the shoes 1 apart so as to force the brake lining 2 mounted on the outer face of each shoe into contact with the flange of drum $a$. All of the above is a well known construction in this art and need not be further described in detail.

Figure 1:
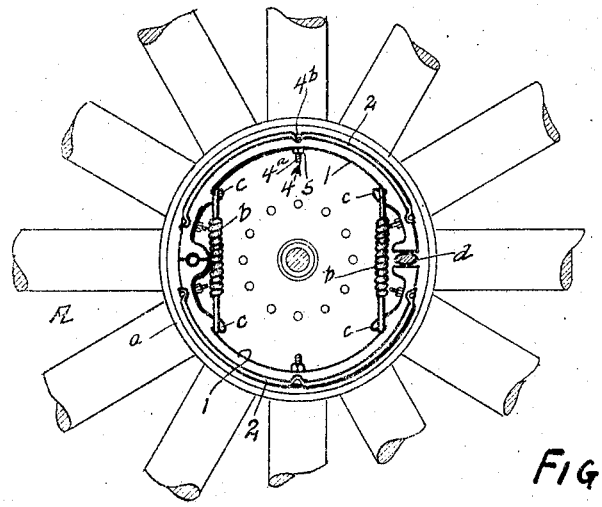
Fig. 1 is a side view of the securing means as applied.
Figure 2:
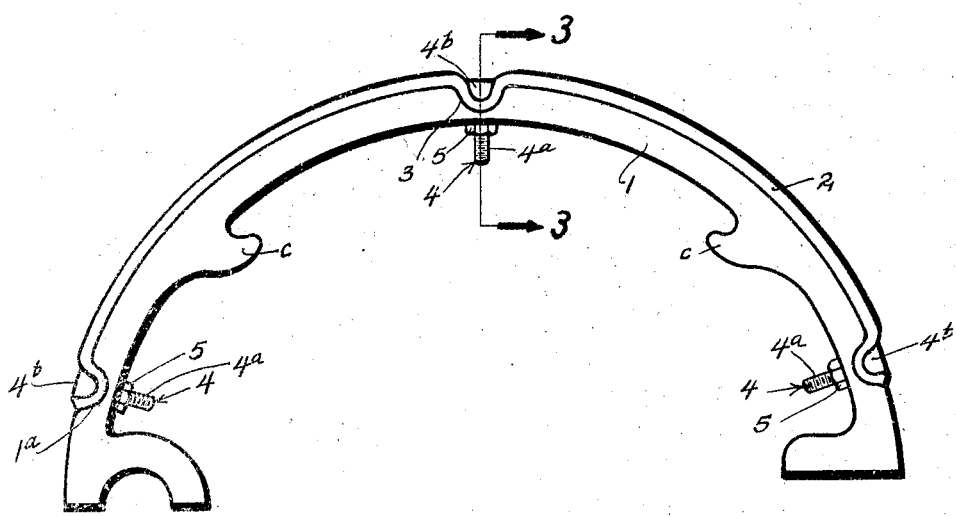
Fig. 2 is a side view of a brakeband section or shoe showing the securing means applied.
Figure 3:
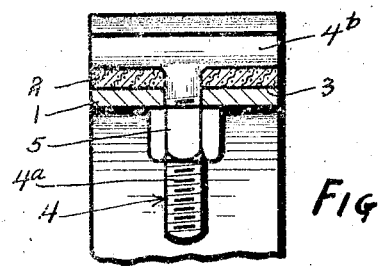
Fig. 3 is a section taken substantially on line 3—3 of Fig. 2.

In putting my invention into effect I provide each shoe 1 in its outer face, and adjacent to each end thereof, with a transversely extending groove or recess $1^a$, and midway between the grooves or recesses $1^a$ I provide a central recess 3. The recesses or grooves $1^a$ and $3^a$ are disposed transversely of the outer face of shoe 1 and are rounded so as to present no sharp corners or edges. In applying the brake lining 2 it is first provided with an opening adjacent to one end which receives shank $4^a$ of a T-bolt 4, the head $4^b$ of this bolt having its inner portion rounded so as to present no sharp corners. The shank of the bolt is inserted through lining 2 and through an opening provided through shoe 1 for this purpose, after which a securing nut 5 is threaded onto the bolt thus drawing the head $4^b$ thereof into recess $1^a$ so as to securely clamp the end of the lining. The lining is then fitted over the outer face of shoe $1^b$ and drawn tight, after which the other end is secured in a similar manner, and the nuts 5 of the end bolts are turned up tight so as to draw the heads $4^b$ of the bolts tightly into the recesses $1^a$ and effectually secure the end of lining 2. After this has been done an opening is made at the central portion of lining 2 and the shank of the central bolt is inserted through this opening and through shoe 1, after which the head of this bolt is drawn tightly into the recess 3 by means of nut 5. This serves to stretch the brake lining 2 tight over the outer face of shoe 1 and the three bolts coact to effectually secure the brake lining so as to prevent displacement thereof. As will be noted more clearly from Figs. 1 and 2, the heads $4^b$ of bolts 4 are of such thickness than when the brake lining 2 has been tightly secured in position the outer faces of the bolt heads are substantially flush with the outer face of shoe 1. This eliminates all possibility of contact of the bolt heads with the brake drum and prevents scraping or scouring of the drum such as frequently occurs when the brake lining is secured by rivets, as is the common practice at present.

This provides very simple and efficient means whereby a brake lining can be readily applied at very small cost and without any necessity for using skilled labor, special tools, etc., such as are now ordinarily required. It is also to be noted that, by using my invention, the brakes can be relined without removing the brake shoes from the housing which effects a material saving in time and labor. In addition, by securing the ends of the brake lining first and then securing the central portion thereof in the manner described, the brake lining can be properly tensioned about the shoe so as to avoid all possibility of displacement of the lining. While I have illustrated and described my invention as applied to a brake shoe of comparatively great thickness, it will be understood that the invention can also be applied to brakebands and other structures of a similar nature other than the comparatively heavy brake shoes herein illustrated. It will also be understood that changes in details of construction and arrangement of parts of the invention may be resorted to without departing from the field and scope of the same, and I intend to include all such variations, as fall within the scope of the appended claim, in this application in which a preferred form only of my invention is disclosed.

What I claim is:—

In combination with a brake shoe of open construction provided adjacent each end and centrally thereof with a transversely extending recess and openings extending through the shoe centrally of said recesses, T-bolts having their shanks extending through the shoe and being disposed so that the heads of the bolts are located within the recesses, a brake lining extending about the shoe with the shanks of the bolts extending through the lining and the heads transversely engaging the lining within the recesses and nuts threaded upon the shanks of the bolts and bearing against the brake shoe upon the face opposite the recesses to provide a single transversely central pull upon the lining at points spaced around the shoe and uniformly tension the lining.

In testimony whereof I affix my signature.

EDWARD TRIST.